(12) United States Patent
Fleurence et al.

(10) Patent No.: US 10,464,478 B2
(45) Date of Patent: *Nov. 5, 2019

(54) DEVICE FOR CONTROLLING THE INTERIOR LIGHTING OF A MOTOR VEHICLE

(71) Applicant: VALEO VISION, Bobigny (FR)

(72) Inventors: Thierry Fleurence, Bobigny (FR); Aymeric Koniec, Villiers sur Marne (FR)

(73) Assignee: VALEO VISION, Bobigny (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,931

(22) Filed: Sep. 6, 2018

(65) Prior Publication Data

US 2019/0071010 A1 Mar. 7, 2019

Related U.S. Application Data

(62) Division of application No. 15/464,847, filed on Mar. 21, 2017, now Pat. No. 10,093,227.

(30) Foreign Application Priority Data

Mar. 21, 2016 (FR) ..................................... 16 52408

(51) Int. Cl.
| | | |
|---|---|---|
| *H05B 37/02* | (2006.01) | |
| *B60Q 3/85* | (2017.01) | |
| *B60Q 3/74* | (2017.01) | |
| *H05B 33/08* | (2006.01) | |
| *B60Q 3/80* | (2017.01) | |

(52) U.S. Cl.
CPC ............... *B60Q 3/85* (2017.02); *B60Q 3/74* (2017.02); *B60Q 3/80* (2017.02); *H05B 33/0854* (2013.01); *H05B 37/0227* (2013.01)

(58) Field of Classification Search
CPC .. B60Q 3/0203; B60Q 3/0293; B60Q 3/0296; H05B 37/0227
USPC ....................................................... 315/77, 82
See application file for complete search history.

(56) References Cited

U.S. PATENT DOCUMENTS

| | | | |
|---|---|---|---|
| 2004/0227625 A1 | 11/2004 | Joehl et al. | |
| 2007/0193811 A1* | 8/2007 | Breed ............... | B60R 21/01536 180/271 |
| 2013/0145360 A1 | 6/2013 | Ricci | |

(Continued)

FOREIGN PATENT DOCUMENTS

| | | |
|---|---|---|
| DE | 10 2009 016 918 A1 | 10/2010 |
| DE | 10 2011 009 229 A1 | 7/2012 |

(Continued)

OTHER PUBLICATIONS

French Preliminary Search Report dated Dec. 5, 2016 in French Application 16 52408, filed on Mar. 21, 2016 ( with English Translation of categories of Cited Documents).

*Primary Examiner* — Tung X Le
(74) *Attorney, Agent, or Firm* — Oblon, McClelland, Maier & Neustadt, L.L.P.

(57) ABSTRACT

A device for controlling the interior lighting of a motor vehicle comprises at least one lighting module capable of emitting a light beam in the passenger compartment, and means for detecting a plurality of gestures of an occupant of the vehicle forming a determined sequence triggering the control of the interior lighting module.

17 Claims, 1 Drawing Sheet

(56) References Cited

U.S. PATENT DOCUMENTS

| | | | |
|---|---|---|---|
| 2014/0142816 A1* | 5/2014 | Moebus | B60Q 3/18 |
| | | | 701/49 |
| 2014/0177393 A1* | 6/2014 | Menne | G01S 15/00 |
| | | | 367/89 |
| 2014/0197757 A1 | 7/2014 | Heinrich | |
| 2014/0309871 A1 | 10/2014 | Ricci | |
| 2014/0361989 A1 | 12/2014 | Entenmann et al. | |
| 2015/0367776 A1 | 12/2015 | Salter | |
| 2016/0023611 A1 | 1/2016 | Huelke | |

FOREIGN PATENT DOCUMENTS

| | | |
|---|---|---|
| DE | 10 2012 022 321 A1 | 5/2014 |
| DE | 10 2015 008 071 A1 | 2/2016 |
| EP | 1 477 351 A2 | 11/2004 |
| EP | 2 977 264 A2 | 1/2016 |
| JP | 2015-205647 | 11/2015 |
| WO | WO 2015/062751 A1 | 5/2015 |
| WO | WO 2015/130571 A1 | 9/2015 |

* cited by examiner

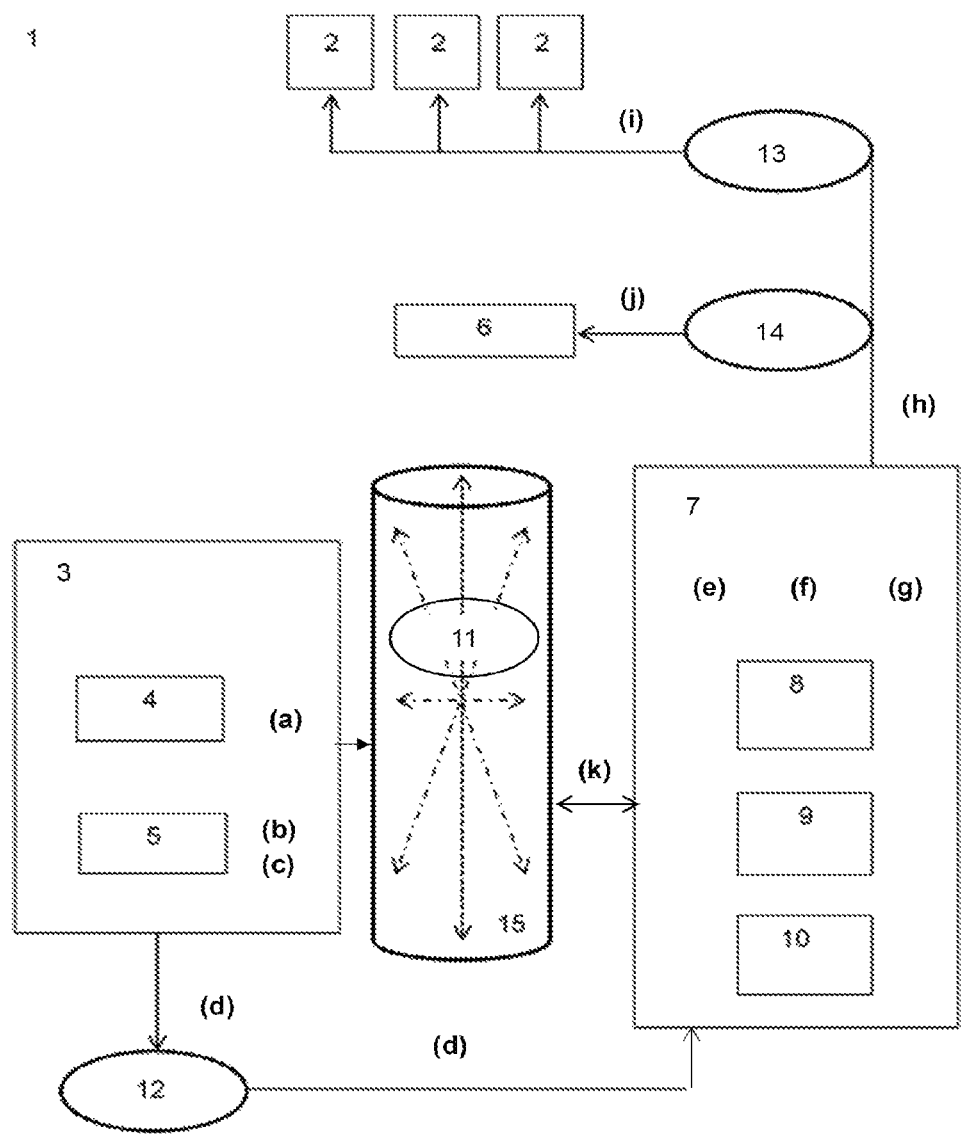

DEVICE FOR CONTROLLING THE INTERIOR LIGHTING OF A MOTOR VEHICLE

CROSS-REFERENCE TO RELATED APPLICATIONS

This application is a divisional application of U.S. application Ser. No. 15/464,847, filed Mar. 21, 2017, the entire contents of which are incorporated herein by reference, and is based upon and claims the benefit of priority from prior French Patent Application No. 16 52408 filed Mar. 21, 2016.

FIELD OF INVENTION

The present invention relates to a control device and method, in particular using gesture recognition, for the interior lighting of a vehicle.

DISCUSSION OF RELATED ART

Movement detection or gesture recognition devices are increasingly widespread in computer systems. In particular, many applications for computers and games consoles are available. In the automotive sector, the development of autonomous and communicating vehicles makes use of touch or voice interfaces to exchange information between the occupant and the vehicle. Some vehicles can provide gesture recognition systems for active safety applications of the vehicle, such as monitoring the alertness of the driver. These systems are capable of detecting and analyzing head, face and eye movements of the driver, such as, for example, the opening of the eyelids, the position of the pupils, the direction of the gaze, the position and inclination of the head. The system, made up of a detection unit, a computing unit and software, is then capable of determining the level of alertness and distraction or the state of drowsiness of the driver and can consequently transmit a falling asleep or distraction alert in real time. The process associated with a gesture recognition control device of this type comprises at least a step of detecting and collecting data, a step of comparing obtained information with reference data, then a step of controlling and/or monitoring vehicle safety implementation functions. In response to a loss of alertness or a distraction of the attention of the driver, the on-board systems are capable of intervening in the control of the vehicle and proposing, for example, a lane-keeping assistance, automatic emergency braking or steering assistance.

SUMMARY OF THE INVENTION

The object of the invention is to propose a reliable gesture recognition control device enabling the control of the interior lighting of a vehicle, said device being capable of limiting the recognitions of spurious movement sequences which may be detrimental to the recognition method and the resulting actions. The device according to the invention increases the safety of the vehicle occupants and does not interfere with the alertness of the driver who continues to concentrate on the movement path of the vehicle. The comfort and well-being of the occupants are also improved.

The subject-matter of the invention is a device for controlling the interior lighting of a motor vehicle, including at least one lighting module capable of emitting a beam of light in the passenger compartment, characterized in that it comprises at least means for detecting a plurality of gestures of an occupant of the vehicle, forming a determined sequence triggering the control of said interior lighting module.

BRIEF DESCRIPTION OF DRAWINGS

FIG. 1 is a schematic representation of a gesture recognition device according to an example embodiment.

DETAILED DESCRIPTION OF INVENTION

Clearly, according to the invention, the detection of a sequence, in particular a gesture sequence, will trigger the control of a beam of light capable of performing an interior lighting function.

It can be provided that a lighting module is capable of emitting a plurality of beams of light, a determined sequence, in particular a gesture sequence, being respectively associated with each beam, the control device being configured to control the emission of one or the other of the beams of light as a function of the detection of one sequence or another sequence. The lighting module may, by way of example, be capable of emitting selectively at least two beams of light which differ in their color and/or their intensity and/or their orientation, the control device being configured to control the emission of one or the other of the beams of light as a function of the detection of a sequence associated with one of the specific beams of light.

Alternatively, or in combination with the preceding aspect, it can also be provided that the lighting device according to the invention includes at least two lighting modules capable of emitting a light beam in the passenger compartment, the control device being configured to control the emission of a light beam by one of the other of the lighting modules as a function of the detection of a sequence associated with this lighting module.

More particularly, it can be provided that a control device according to the invention comprises at least one gesture sequence detection and capture module capable of detecting, capturing and recording a gesture sequence of an occupant of the vehicle in an active detection area of the passenger compartment in order to transmit data representing said gesture sequence, a control module connected to said gesture sequence detection and capture module, capable of receiving the data representing said recorded gesture sequence, comparing them with at least one reference gesture sequence and determining whether the threshold conditions for triggering a lighting function have been met, said control module being configured to generate and transmit at least one instruction to activate and/or deactivate and/or vary the light intensity and/or orientation of a beam emitted by the at least one lighting module.

The detected gesture sequence consists of a succession of gestures defined by the movement of all or part of the body of at least one occupant, preferably an upper limb of an occupant, preferably of the driver. Each upper limb is made up of three segments: arm, forearm and hand.

A gesture sequence is detected when a different position of the part of the body detected in motion is recorded at regular, advantageously very short, intervals.

A gesture sequence is mainly defined by a movement path followed in an active detection area, according to a vertical, horizontal or diagonal orientation, in one direction or the other.

The orientation of the gesture sequence, i.e. the direction and course which can be determined by aligning all the positions of the detected part of the body, determines an activation or deactivation of a light source and/or a corresponding orientation of all or part of the lighting module in order to move the beam as a result.

The speed of performance of the gesture sequence can also be taken into account. Clearly, depending on the quantity of lighting modules to be activated and their positions in the passenger compartment, many combinations of gestures associated with precise detection areas can be created in such a way as to constitute a functional sign language.

Similarly, an active detection area is understood to mean an area of the passenger compartment which can be defined either by one or more 2D flat surfaces or by one or more 3D volumes. The active detection area may broadly cover the passenger compartment, by being centered on the median axis of the passenger compartment or, in order to improve the definition of the images taken in the area, may be targeted on a part of the passenger compartment and, in particular, that of the driver or a part of the passenger compartment in which an occupant has been detected.

It can be provided that the lighting module comprises a light source, in particular comprising at least one light emitting diode (LED), which may be housed in the dome light of the vehicle.

The gesture sequence detection and capture module of the gesture recognition control device is capable of detecting, capturing and recording any gesture sequence performed by at least one occupant of the vehicle in an active detection area of the passenger compartment and of generating and transmitting data representing said gesture sequence.

According to one advantageous characteristic of the invention, the gesture sequence detection and capture module of the gesture recognition control device is oriented toward at least one active detection area of the passenger compartment of the vehicle and is made up of at least one gesture detection means capable of detecting at least one directional gesture or movement of at least one occupant of the vehicle in said active detection area potentially initiating a gesture sequence and/or at least one image acquisition means capable of capturing and recording a sequence of images corresponding to the gesture sequence detected by said detection means.

The image acquisition means is activated when a movement and/or gesture is detected by the detection means in the active detection area in order to prevent the image acquisition means from operating in a continuous and power-consuming manner. It is conceivable that the control device does not comprise detection means, whereby this means has a function of detecting a gesture initiating a gesture sequence which is subsequently to be acquired. In this case, a continuous recording of the detection area is ensured and the acquired images are all processed.

The gesture sequence detection and capture module may comprise a single image acquisition means, oriented toward a single active detection area in such a way that the driver is the only person capable of interacting with the gesture recognition control device, or it may comprise a plurality of image acquisition means, oriented toward one or more active detection areas, in such a way that all the occupants of the vehicle are capable of interacting individually with the gesture recognition control device.

The gesture sequence detection means may comprise any type of sensor and/or camera capable of detecting at least one movement or gesture of an occupant of the vehicle in a predefined active detection area. By way of a non-limiting example, the sensor may be an infrared and/or ultrasound and/or radar sensor. The detection means may comprise a plurality of different types of sensor, and a particular sensor may be chosen according to information received by the control module regarding the luminosity conditions. The gesture sequence detection means interacts with the image acquisition means as previously described.

The image acquisition means of the gesture sequence detection and capture module is made up of any 2D, 3D recording means, image and/or video source, said means being capable of capturing, generating and recording fixed or directional 2D or 3D gesture sequences performed in an active detection area. By way of a non-limiting example, the recording means is one or more still and/or motion cameras. A camera is understood to mean, for example, a thermal imaging camera and/or a camera for visible light and/or an infrared camera which can operate at any luminous intensity level in the passenger compartment and/or a laser camera and/or a radar camera.

The data acquired and generated by the gesture sequence detection and capture module comprise data defining one-dimensional, two-dimensional or three-dimensional geometric shapes and/or data representing at least one position or movement path of the part of the body detected in an active detection area. "Boxes" are thus defined in which the presence of a determined part is identified, and the movement of the succession of "boxes" corresponding to the movement of the detected part of the body is analyzed. These data, representing the gesture sequence performed by an occupant of the vehicle, are transmitted to the control module of the gesture recognition control device according to the invention.

The gesture recognition control device may comprise at least one display means which can be configured to display visual feedback relating to the current position of the part of the body involved in the operation of the device according to the invention and/or the positions or gesture sequences required to activate the controls of the lighting modules. The display means may also enable the manual selection of the lighting functions.

According to one advantageous characteristic of the invention, the control module of the gesture recognition control device is a central data processing unit connected to at least one gesture sequence detection and capture module and/or at least one display means. The control module comprises, as a minimum, a processor, a memory and a data storage means. The data storage means includes the database containing the reference gesture sequences, the lighting function activation instructions executable by the processor, and any data reception and transmission instruction.

The operating principle of the control module of the gesture recognition control device according to the invention is based on the interdependence existing between a plurality of gesture sequences performed by at least one occupant of the vehicle, preferably by an upper limb of said occupant, detected in a plurality of active detection areas of the passenger compartment, and a plurality of passenger compartment lighting activation functions. According to this operating principle, the control module is configured to:
  receive data representing the gesture sequence detected and recorded by at least one gesture sequence detection and capture module,
  analyze said data relating to the one-dimensional, two-dimensional or three-dimensional geometric shape and/or the position of the gesture sequence and compare them with reference gesture sequences stored in a database,
  determine whether said recorded gesture sequence is similar to one of the reference gesture sequences and whether this similarity meets the threshold conditions for triggering a lighting function, transmit a determined instruction to at least one lighting module and/or to the display means.

For the purpose of obtaining the activation of at least one lighting module, an occupant of the vehicle moves all or part of one of his upper limbs and, in a voluntary and specific manner, performs a gesture sequence in an active detection area of the passenger compartment. As a result of these detection, analysis, comparison and control steps specific to the gesture recognition control device according to the invention, any other spurious movement has no impact on the activation of the lighting modules.

According to one characteristic advantage, the control module has a capacity to learn new movements which may be recorded for the purpose of supplying the database with new reference gesture sequences.

The invention also relates to an interior lighting control method during which, following a gesture sequence of at least one occupant in a detection area of the passenger compartment, at least the following steps are performed:
- a step of capturing and recording two-dimensional (2D) and/or three-dimensional (3D) images of said gesture sequence,
- a step of analyzing images in order to generate data representing the detected gesture sequence,
- a step of transmitting data representing said gesture sequence,
- a step of transmitting said representative data to at least one control module,
- a step of analyzing said data relating to the one-dimensional, two-dimensional or three-dimensional geometric shape and/or the position and/or the movement path of said gesture sequence,
- a step of comparing said data relating to said recorded gesture sequence with at least one reference gesture sequence stored in a database,
- a step of determining whether the threshold conditions for triggering a lighting function are met,
- if the trigger threshold conditions are met, a step of transmitting and executing at least one instruction to at least one lighting module integrated into the passenger compartment of the vehicle to activate and/or deactivate it and/or vary the luminous intensity thereof.

According to one advantageous characteristic, the control method comprises a step of learning at least one new reference gesture sequence. This learning step may be implemented according to an iterative process during which the user repeats the same gesture sequence in order that the control module can synthesize it and generate an average movement defining a new reference gesture sequence.

Furthermore, a gesture sequence detection means and an image acquisition means which are separate from one another and are capable of interacting with one another can be implemented in the analysis step, said image acquisition means being implemented only when the detection means has detected the start of a gesture which may initiate a gesture sequence.

In an alternative to this last embodiment, it can be provided to implement in the analysis step an image acquisition means which continuously retrieves images targeted on the detection area.

Other characteristics and advantages of the invention will become clearer from a reading of the detailed description of an embodiment of the invention, given by way of an illustrative and non-limiting example and referring to the single FIGURE which shows the gesture recognition control device for the interior lighting of a vehicle according to the invention and steps of the associated method.

A gesture recognition device 1 for the interior lighting of a vehicle comprises at least one lighting module 2, configured to illuminate the passenger compartment and disposed for this purpose, for example, in the dome light, and different modules, including at least one gesture sequence detection and capture module 3, the configuration of which will be described in greater detail below, and a control module 7 which may comprise, in particular, a processor 8, a memory 9 and a data storage means 10. The device may furthermore comprise a display means 6, preferably integrated into the instrument panel of the vehicle.

In the illustrated example, the gesture sequence detection and capture module 3, preferably located in the front part of the passenger compartment of the vehicle, is made up of one or more detection means 4 for detecting a gesture sequence 11, and one or more image acquisition means 5. These elements that make up the gesture sequence detection and capture module 3 interact and communicate with one another in such a way as to detect, capture, and record at least one gesture sequence 11 performed in an active detection area of the passenger compartment 15 by an occupant of the vehicle, preferably the driver.

The detection means 4 consist(s) here of one or more infrared sensors disposed in the passenger compartment and the image acquisition means 5 consist(s) of one or more video cameras disposed independently from the detection means in the passenger compartment, whereby at least one detection means and one image acquisition means are configured to target the same part of the passenger compartment. Clearly, the benefit in separating these two means lies in controlling the lighting of the image acquisition means only when the detection means have detected the start of a movement that may correspond to a gesture sequence 11. This avoids the need for image acquisition means which operate continuously. However, as previously described, only a single device combining the detection means and the image acquisition means could be used.

According to different variants of the invention, the gesture sequence detection and capture module 3 may comprise a single image acquisition means 5, oriented toward a single active detection area 15 in such a way that the driver is the only person capable of interacting with the gesture recognition control device, or it may comprise a plurality of image acquisition means 5, oriented toward one or more active detection zones in such a way that all the occupants of the vehicle are capable of interacting individually with the gesture recognition control device 1. Clearly, the number and configuration of the detection means could be determined according to the presence of one or more active detection areas 15.

A gesture sequence 11 is defined by a vertical, horizontal and/or diagonal movement path followed in an active detection area 15. The speed of performance of the gesture sequence 11 may also be taken into account in order to distinguish a single gesture, referred to as a fixed gesture sequence, from a movement, referred to as a directional gesture sequence.

Depending on the quantity of lighting modules 2 to be activated and their positioning in the passenger compartment, many combinations of gestures associated with precise detection areas 15 can be created in such a way as to constitute a functional sign language.

In the main and preferred embodiment of the invention, the gesture sequences are performed by an occupant sitting in the front of the vehicle, preferably by the driver for the purpose of activating a lighting module 2, preferably a central dome light located in the front part of the passenger compartment.

In this configuration, four combinations of conceivable gesture sequences 11 will be described by way of a non-limiting example, said combinations having to be performed in an active detection area 15 centered on the front part of the passenger compartment. These combinations consist of a succession of positions of the arm of the driver, identified as such by a processing of the images acquired by the image acquisition means 5 in the active detection area.

A first combination of gesture sequences switches on the dome light, this first combination consisting of a fast vertical raising of the right upper limb of the driver in the direction of the roof of the passenger compartment to reach a high position, maintained for a few seconds, with the right hand open and the palm flat, to finish with a return of the upper limb to its current position on the steering wheel or on the gear lever or resting on an armrest.

A second combination of gesture sequences increases the luminous intensity of a lighting module, this second combination consisting in a slow raising, with the first clenched, of the right upper limb of the driver from the gear lever in the direction of the roof of the passenger compartment.

A third combination of gesture sequences reduces the luminous intensity of a lighting module, this third combination consisting in a slow lowering, with the first clenched, of the right upper limb of the driver from a high point of the passenger compartment to the gear lever.

A fourth combination of gesture sequences switches off a lighting module, and this combination may begin with a fast vertical raising of the right upper limb of the driver in the direction of the roof of the passenger compartment to reach a high position, where the forearm, with the hand open and the palm flat, would perform a left/right sweeping movement back and forth to end with a return of the upper limb to its current position on the steering wheel or on the gear lever or resting on an armrest.

In the preceding description, the activation and deactivation of the lighting modules have been linked to the detection of gesture sequences. Clearly, gesture recognition is applied only to generate instructions to modify the luminous intensity and/or orientation of the beam emitted by the lighting modules, and the activation and deactivation operations are performed by an action of the driver on a control button, the acquisition of the images in the detection zone 15 then beginning only when the control button is actuated.

Other combinations of gesture sequences are conceivable, depending on the positioning of the lighting modules in the passenger compartment. A gesture sequence having a diagonal and/or horizontal orientation may, for example, be linked to the activation of front and/or rear side lighting modules and/or to the orientation of the light beam projected by each of the lighting modules.

All of these combinations make up reference gesture sequences on the basis of which the control module 7 will analyze and compare the data 12 representing gesture sequences 11 performed by the driver. These reference sequences are preferably learnt and reproduced by the driver for the purpose of activating and controlling a lighting module 2. The acquisition and storage of any new reference sequence devised by the driver himself, by the gesture recognition control device 1, in particular by the control module 7, are also possible.

The control method according to the invention has been explained above and reference will again be made to the FIGURE to describe it in other words. The control method is based on the interdependence existing between a plurality of gesture sequences 11, a plurality of active detection areas 15 and a plurality of activation functions for the lighting of the passenger compartment, and on the interconnection of and communication between the elements that make up the gesture recognition control device 1.

According to the main and preferred embodiment of the invention, the method initially comprises a step of detecting (a), in a detection area 15 of the passenger compartment, an initiation of a gesture sequence 11 performed by all or part of the body of at least one occupant of the vehicle, this detection being implemented by the gesture sequence detection and capture module 3, preferably by the detection means 4. This detection step is followed by a step of capturing and recording (b) 2D and/or 3D images of said gesture sequence 11 implemented by the gesture sequence detection and capture module 3, preferably by the image acquisition means 5, then a step of generation (c) of data 12 representing said gesture sequence 11 by the gesture sequence detection and capture module 3, preferably by image processing means associated with the image acquisition means 5. Said representative data 12 comprise data defining one-dimensional, two-dimensional or three-dimensional geometric shapes and/or data representing at least one position or movement path in an active detection area, for example a point or point cloud.

A communication then takes place between the gesture sequence detection and capture module and the control module 7 by means of a step of transmitting (d) said representative data 12 to the control module 7 which then generates different successive steps including:
- a step of analyzing said data 12 relating to the one-dimensional, two-dimensional or three-dimensional geometric shape and/or the position and/or the movement path of said gesture sequence 11,
- a step of comparing (f) said data relating to said recorded gesture sequence with at least one reference gesture sequence stored in a database,
- a step of determining (g) whether the threshold conditions for triggering a lighting function are met.

If the trigger threshold conditions are met, it is possible to provide, simultaneously or with a slight time lag, a step of transmitting (h) and executing (i) at least one instruction 13 to at least one lighting module 2 integrated into the passenger compartment of the vehicle to activate and/or deactivate and/or vary the luminous intensity and/or orientation of the beam to be emitted, and a step of transmitting (h) and executing (j) at least one display instruction 14 to the display means 6 in order to inform the occupants of the vehicle of the nature of the modification made to the emitted light beam.

The control method may furthermore comprise a step of learning (k) at least one new reference gesture sequence.

The invention claimed is:

1. A device for controlling interior lighting of a motor vehicle, the device comprising:
   at least one lighting device configured to emit a beam of light in a passenger compartment; and
   a detector configured to
   detect a plurality of gestures of an occupant of the vehicle in an active detection area of the passenger compartment, forming a determined sequence triggering control of the lighting device, the active detection area being defined by boxes in which presence of a part of a body of the occupant is identified, and analyze movement of a succession of boxes corresponding to movement of the part of the body to determine data representing a gesture sequence.

2. The device according to claim 1, further comprising:
control circuitry, connected to the detector, wherein
the detector is configured to detect, capture, and record the gesture sequence of the occupant of the vehicle in the active detection area of the passenger compartment,
the control circuitry is configured to receive the data representing the recorded gesture sequence, compare the data representing the recorded gesture sequence with at least one reference gesture sequence, and determine whether threshold conditions for triggering a lighting function have been met, and
the control circuitry is configured to generate and transmit at least one instruction to activate and/or deactivate and/or vary light intensity and orientation of the beam emitted by the lighting device.

3. The device according to claim 2, wherein the gesture sequence is defined by its vertical and/or horizontal and/or diagonal orientation and its speed of performance.

4. The device according to claim 3, wherein the active detection area extends along the median axis of the passenger compartment of the vehicle.

5. The device according to claim 2, wherein the active detection area extends along the median axis of the passenger compartment of the vehicle.

6. The device according to claim 5, wherein the detector includes a sensor and/or at least one camera.

7. The device according to claim 2, wherein the detector includes a sensor and/or at least one camera.

8. The device according to claim 7, wherein the detector includes a single camera.

9. The device according to claim 7, wherein the detector includes a plurality of cameras.

10. The device according to claim 9, wherein the detector includes at least one infrared sensor and/or ultrasound sensor and/or radar sensor.

11. The device according to claim 7, wherein the detector includes at least one infrared sensor and/or ultrasound sensor and/or radar sensor.

12. The device according to claim 11, wherein the camera includes one or more still and/or motion cameras.

13. The device according to claim 7, wherein the camera includes one or more still and/or motion cameras.

14. The device according to claim 13, wherein the data representing the gesture sequence define one-dimensional, two-dimensional or three-dimensional geometric shapes and/or positions and/or movement paths.

15. The device according to claim 2, wherein the data representing the gesture sequence define one-dimensional, two-dimensional or three-dimensional geometric shapes and/or positions and/or movement paths.

16. A method for controlling lighting of a motor vehicle, the method comprising:
detecting a plurality of gestures of an occupant of the motor vehicle in an active detection area of a passenger compartment, forming a determined sequence triggering control of a lighting device, the lighting device being configured to emit a beam of light in the passenger compartment, the active detection area being defined by boxes in which presence of a part of a body of the occupant is identified; and
analyzing movement of a succession of boxes corresponding to movement of the part of the body to determine data representing a gesture sequence.

17. The method according to claim 16, further comprising:
detecting, capturing, and recording the gesture sequence of the occupant of the vehicle in the active detection area of the passenger compartment;
receiving the data representing the recorded gesture sequence, comparing the data representing the recorded gesture sequence with at least one reference gesture sequence, and determining whether threshold conditions for triggering a lighting function have been met; and
generating and transmitting at least one instruction to activate and/or deactivate and/or vary light intensity and orientation of the beam emitted by the lighting device.

* * * * *